(12) United States Patent
Kim et al.

(10) Patent No.: US 9,444,118 B2
(45) Date of Patent: Sep. 13, 2016

(54) BATTERY PACK

(75) Inventors: Bongyoung Kim, Yongin-si (KR); Kiho Shin, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1147 days.

(21) Appl. No.: 13/451,363

(22) Filed: Apr. 19, 2012

(65) Prior Publication Data

US 2012/0299549 A1 Nov. 29, 2012

Related U.S. Application Data

(60) Provisional application No. 61/490,542, filed on May 26, 2011.

(51) Int. Cl.
| | | |
|---|---|---|
| *H02J 7/00* | (2006.01) | |
| *H01M 10/04* | (2006.01) | |
| *H01M 10/44* | (2006.01) | |
| *H01M 10/48* | (2006.01) | |
| *H01M 10/42* | (2006.01) | |

(52) U.S. Cl.
CPC ....... *H01M 10/0445* (2013.01); *H01M 10/441* (2013.01); *H02J 7/0024* (2013.01); *H01M 10/482* (2013.01); *H01M 2010/4271* (2013.01)

(58) Field of Classification Search
CPC .............................................. H01M 10/0445
USPC ......................................... 320/107, 112, 118
See application file for complete search history.

(56) References Cited

U.S. PATENT DOCUMENTS

| | | | |
|---|---|---|---|
| 5,811,959 A | 9/1998 | Kejha | |
| 7,486,045 B2 | 2/2009 | Yamaguchi et al. | |
| 7,688,038 B2 | 3/2010 | Chen et al. | |
| 8,945,735 B2 | 2/2015 | Kim | |
| 2001/0005125 A1 | 6/2001 | Nagai et al. | |
| 2006/0092583 A1* | 5/2006 | Alahmad | H02J 7/0024 361/15 |
| 2007/0108939 A1* | 5/2007 | Miyagi | H01M 2/1077 320/112 |

(Continued)

FOREIGN PATENT DOCUMENTS

| | | |
|---|---|---|
| CN | 1595704 A | 3/2005 |
| CN | 101286644 A | 10/2008 |

(Continued)

OTHER PUBLICATIONS

Extended European Search Report dated Aug. 22, 2012 for European Patent Application No. EP 12 16 9530.8 which corresponds to captioned U.S. Appl. No. 13/451,363.

*Primary Examiner* — Richard V Muralidar
(74) *Attorney, Agent, or Firm* — Knobbe, Martens, Olson & Bear, LLP

(57) ABSTRACT

A battery pack is disclosed. In one embodiment, the battery pack includes a battery module including a plurality of battery units. It further includes a battery management unit including a plurality of charge terminals and a plurality of discharge terminals electrically connected to terminals of the plurality of battery units, and controlling charging/discharging of the battery module. It further includes a control unit including a plurality of discharge control terminals electrically connected to the plurality of discharge terminals, a discharge control switch installed between each of the plurality of discharge control terminals, and a charge recognizing unit, and controlling the operation of the discharge control switch according to the level of voltage detected by the charge recognizing unit.

22 Claims, 8 Drawing Sheets

(56) References Cited

U.S. PATENT DOCUMENTS

| | | | |
|---|---|---|---|
| 2010/0121511 A1 | 5/2010 | Onnerud et al. | |
| 2011/0193525 A1 | 8/2011 | Ro | |

FOREIGN PATENT DOCUMENTS

| | | |
|---|---|---|
| CN | 101814725 A | 8/2010 |
| CN | 201732841 U | 2/2011 |
| JP | 58-107032 A | 6/1983 |
| JP | 6-84546 A | 3/1994 |
| JP | 08-340641 A | 12/1996 |
| JP | 2008-43009 A | 2/2008 |
| JP | 2008-148387 A | 6/2008 |
| JP | 2010-154720 A | 7/2010 |
| KR | 10-2001-0062697 A | 7/2001 |
| KR | 10-0478832 B1 | 3/2005 |
| KR | 10-2008-0053713 A | 6/2008 |
| KR | 10-2008-0057538 A | 6/2008 |
| KR | 10-2010-0032961 A | 3/2010 |
| KR | 10-2011-0093023 A | 8/2011 |
| WO | WO 2010/042517 A1 | 4/2010 |

\* cited by examiner

BATTERY PACK

CROSS-REFERENCE TO RELATED APPLICATIONS

This application claims priority to U.S. Provisional No. 61/490,542, titled "BATTERY PACK" filed May 26, 2011, which is hereby incorporated by reference in its entirety.

BACKGROUND

1. Field

The disclosed technology relates to a battery pack, and a terminal configuration thereof.

2. Description of the Related Technology

Rechargeable secondary batteries are used as portable power sources for portable electronic equipment such as cellular phones, notebook computers, camcorders, personal digital assistants (PDA), and home appliances such as a vacuum cleaner. In a typical home vacuum cleaner, a motor of the vacuum cleaner is driven using AC power. However, in order to use the home vacuum cleaner in a space without AC power connected, a secondary battery as a separate power source is provided. The secondary battery has capabilities according to the application, and in many applications, high capacity voltage of approximately 100 V or higher is required.

SUMMARY OF CERTAIN INVENTIVE ASPECTS

An aspect of the present invention provides a battery pack for achieving high-efficiency charging and high-power discharging.

Another inventive aspect is a battery pack, including a plurality of positive and negative battery terminals, configured to connect to a plurality of battery units. The battery pack also includes a plurality of positive charge terminals, each connected to one of the positive battery terminals, and a plurality of positive discharge terminals, each connected to one of the positive battery terminals. The battery pack also includes a plurality of negative charge terminals, each connected to one of the negative battery terminals, a plurality of negative discharge terminals, each connected to one of the negative battery terminals, and a plurality of discharge control switches connected to the positive and negative discharge terminals, and a control unit, configured to control the state of the switches so as to selectively series connect the battery units.

Another inventive aspect is a battery pack, including a plurality of battery units, each configured to be individually charged by an external charger and to be discharged by providing power to an external load, a plurality of switches connected to the battery units, and a control unit configured to control the switches so that if the battery pack is not being charged, the battery units are serially connected.

Another inventive aspect is a battery pack, including a plurality of battery units, each battery unit having a positive and a negative terminal, and a control unit configured to provide a first configuration for discharging the battery units, where the battery units are connected, and to provide a second configuration for charging the battery units, where the battery units are not connected.

DETAILED DESCRIPTION OF CERTAIN INVENTIVE EMBODIMENTS

Example embodiments will now be described more fully with reference to the accompanying drawings; however, the inventive features and aspects may be embodied in different forms and should not be construed as being limited to the embodiments set forth herein. Rather, these embodiments are provided so that this disclosure will be thorough and complete.

Figure 1A:
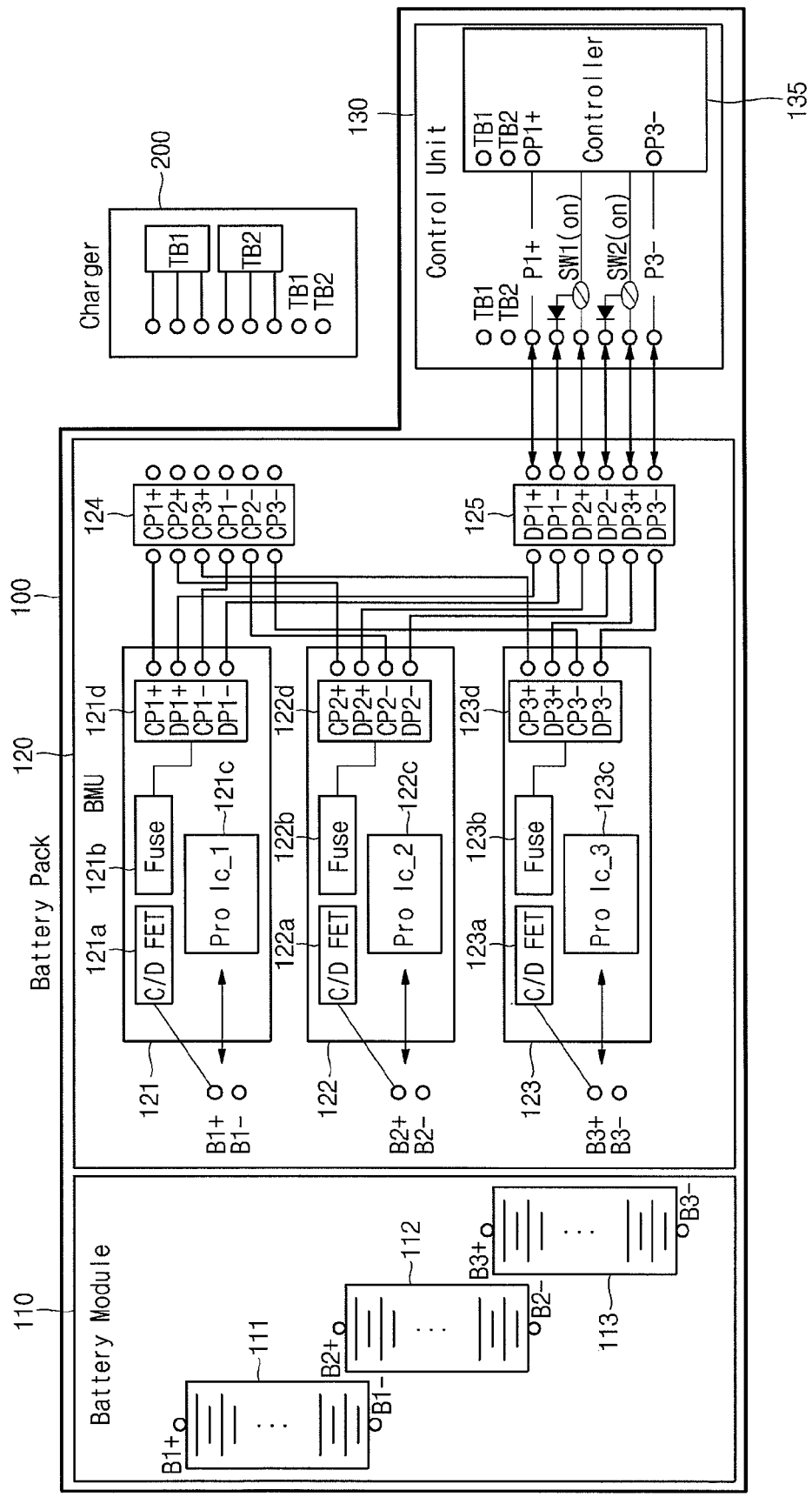
FIG. 1A is a block diagram illustrating a battery pack and a charger in a discharge standby mode according to an embodiment of the present invention.
Figure 1B:
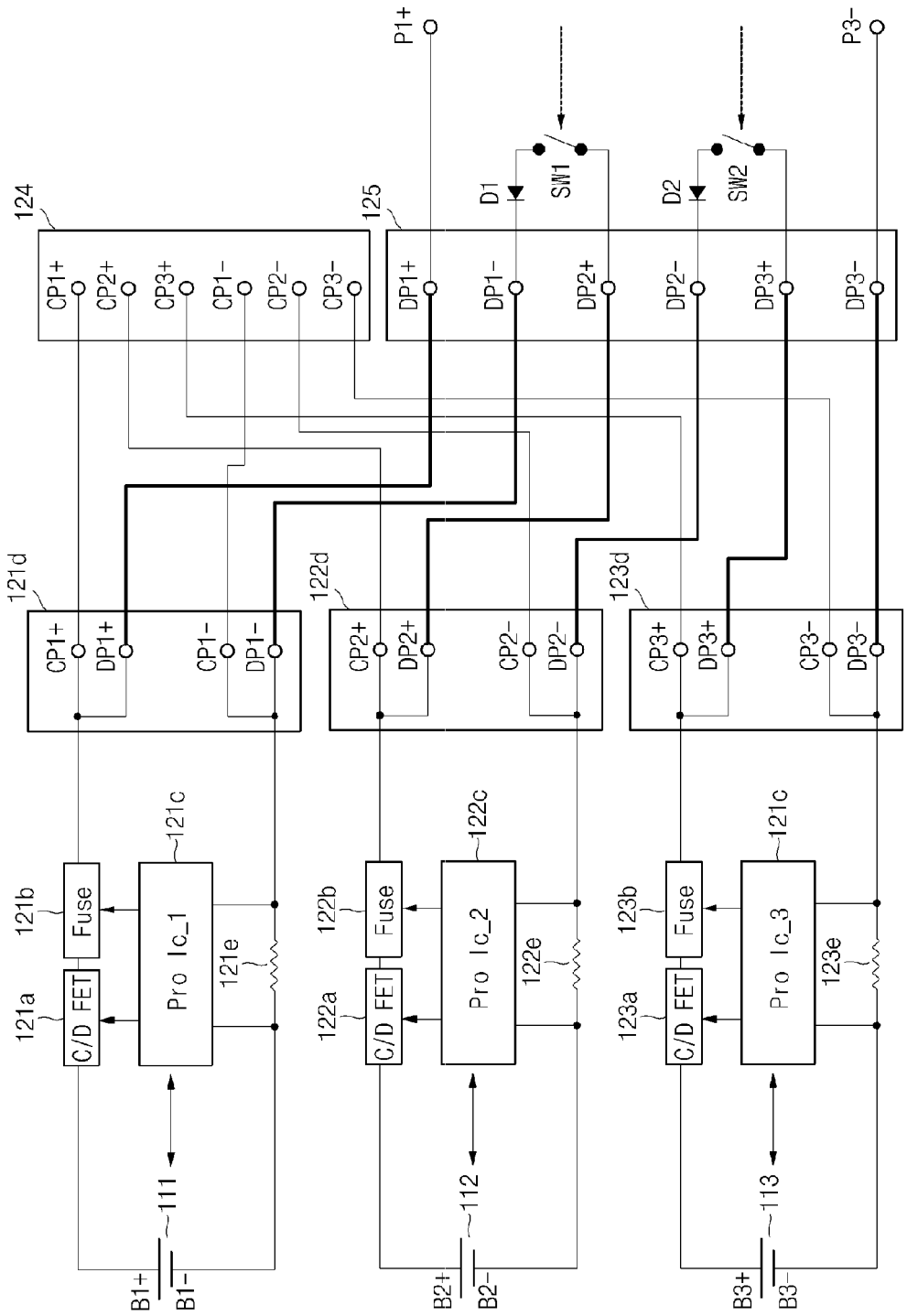
FIG. 1B is a circuit diagram corresponding to FIG. 1A.

FIG. 1A is a block diagram illustrating a battery pack 100 and a charger 200, and FIG. 1B is a circuit diagram corresponding to FIG. 1A. Referring to FIGS. 1A and 1B, the battery pack 100 includes a battery module 110, a battery management unit 120, and a control unit 130, such as a microcontroller.

The battery module 110 includes a plurality of battery units. For example, as shown in FIG. 1A, the battery module 110 may include first to third battery units 111, 112 and 113. The battery module 110 is described with the battery module 110 including three battery units, but other embodiments have different numbers of battery units.

Each of the battery units 111, 112 and 113 includes a plurality of battery cells. The plurality of battery cells included in each of the battery units 111, 112 and 113 are connected to each other in series or in parallel.

In addition, the battery units 111, 112 and 113 include terminals, respectively. For example, as shown in FIG. 1A, the first battery unit 111 includes a first positive terminal B1+ and a first negative terminal B1−. In addition, the second battery unit 112 includes a second positive terminal B2+ and a second negative terminal B2−. In addition, the third battery unit 113 includes a third positive terminal B3+ and a third negative terminal B3−.

The battery management unit 120 includes first to third single battery management units 121, 122 and 123, a charge terminal unit 124, and a discharge terminal unit 125.

The first single battery management unit 121 includes a first charge/discharge switch 121a, a first fuse unit 121b, a first switch control unit 121c, and a first charge/discharge terminal unit 121d. The first charge/discharge switch 121a may consist of a charge switch and a discharge switch. The charge switch and the discharge switch may be electrically connected between the first positive terminal B1+ of the first battery unit 111 and the first positive battery terminal B1+ of the first single battery management unit 121. The first charge/discharge switch 121a allows the first battery unit 111 to be charged and discharged and serves as a primary protective circuit device when over-charge or over-discharge occurs.

The first fuse unit 121b may consist of a first fuse, a first heat resistor, and a first fuse switch. In such a case, the first fuse unit 121b may serve as a secondary protective circuit device when the first charge/discharge switch 121a is damaged, malfunctions, or is otherwise insufficient. In this embodiment, the first fuse switch is controlled by the first switch control unit 121c.

The first switch control unit 121c controls the switching operation of the first charge/discharge switch 121a according to charge/discharge mode, thereby controlling charging and discharging of the first battery unit 111. In addition, the first switch control unit 121c detects one or more voltages of the first battery unit 111 and performs over-charge/over-discharge protection and voltage balancing of the first battery unit 111 based on the detected voltages.

The first charge/discharge terminal unit 121d includes a first positive charge terminal CP1+ and a first positive discharge terminal DP1+ connected to the first fuse unit 121b, and a first negative charge terminal CP1− and a first negative discharge terminal DP1− connected to the first negative terminal B1− of the first battery unit 111 through the first negative battery terminal B1− of the first single battery management unit 121.

In this embodiment, the first positive terminal B1+ of the first battery unit 111 is connected to the first positive charge terminal CP1+ and the first positive discharge terminal DP1+ through the first charge/discharge switch 121a and the first fuse unit 121b. In addition, the first negative terminal B1− of the first battery unit 111 is connected to the first negative charge terminal CP1− and the first negative discharge terminal DP1− through a current sensor 121e for sensing the current of the first battery unit 111. In some embodiments, the first negative terminal B1− of the first battery unit 111 is directly connected to the first negative charge terminal CP1− and the first negative discharge terminal DP1−.

The second single battery management unit 122 includes a second charge/discharge switch 122a, a fuse 122b, a second switch control unit 122c, and a second charge/discharge terminal unit 122d. The second charge/discharge switch 122a may consist of a charge switch and a discharge switch. The charge switch and the discharge switch may be electrically connected between the second positive terminal B2+ of the second battery unit 112 and the second positive battery terminal B2+ of the second single battery management unit 122. The second charge/discharge switch 122a allows the second battery unit 112 to be charged and discharged and serves as a primary protective circuit device when over-charge or over-discharge occurs.

The second fuse unit 122b may consist of a second fuse, a second heat resistor, and a second fuse switch. In such a case, the second fuse unit 122b may serve as a secondary protective circuit device when the second charge/discharge switch 122a is damaged, malfunctions, or is otherwise insufficient. In this embodiment, the second fuse switch is controlled by the second switch control unit 122c.

The second switch control unit 122c controls the switching operation of the second charge/discharge switch 122a according to charge/discharge mode, thereby controlling charging and discharging of the second battery unit 112. In addition, the second switch control unit 122c detects one or more voltages of the second battery unit 112 and performs over-charge/over-discharge protection and voltage balancing of the second battery unit 112 based on the detected voltages.

The second charge/discharge terminal unit 122d includes a second positive charge terminal CP2+ and a second positive discharge terminal DP2+ connected to the second fuse unit 122b, and a second negative charge terminal CP2− and a second negative discharge terminal DP2− connected to the second negative terminal B2− of the second battery unit 112 through the second negative battery terminal B2− of the second single battery management unit 122.

In this embodiment, the second positive terminal B2+ of the second battery unit 112 is connected to the second positive charge terminal CP2+ and the second positive discharge terminal DP2+ through the second charge/discharge switch 122a and the second fuse unit 122b. In addition, the second negative terminal B2− of the second battery unit 112 is connected to the second negative charge terminal CP2− and the second negative discharge terminal DP2− through a current sensor 122e for sensing the current of the second battery unit 112. In some embodiments, the second negative terminal B2− of the second battery unit 112 is directly connected to the second negative charge terminal CP2− and the second negative discharge terminal DP2−.

The third single battery management unit 123 includes a third charge/discharge switch 123a, a fuse 123b, a third switch control unit 123c, and a third charge/discharge terminal unit 123d. The third charge/discharge switch 123a may consist of a charge switch and a discharge switch. The charge switch and the discharge switch may be electrically connected between the third positive terminal B3+ of the third battery unit 113 and the third positive battery terminal B3+ of the first single battery management unit 121. The third charge/discharge switch 123a allows the third battery unit 113 to be charged and discharged and serves as a primary protective circuit device when over-charge or over-discharge occurs.

The third fuse unit 123b may consist of a third fuse, a third heat resistor, and a third fuse switch. In such a case, the third fuse unit 123b may serve as a secondary protective circuit device when the third charge/discharge switch 123a is damaged, malfunctions, or is otherwise insufficient. In this embodiment, the third fuse switch is controlled by the third switch control unit 123c.

The third switch control unit 123c controls the switching operation of the third charge/discharge switch 123a according to charge/discharge mode, thereby controlling charging and discharging of the third battery unit 113. In addition, the third switch control unit 123c detects one or more voltages of the third battery unit 113 and performs over-charge/over-discharge protection and voltage balancing of the third battery unit 113 based on the detected voltages.

The third charge/discharge terminal unit 123d includes a third positive charge terminal CP3 and a third positive discharge terminal DP3+ connected to the second fuse unit 123b, and a third negative charge terminal CP3− and a third negative discharge terminal DP3− connected to the third negative terminal B3− of third battery unit 113 through the third negative battery terminal B3− of the first single battery management unit 123.

In this embodiment, the third positive terminal B3+ of the third battery unit 113 is connected to the third positive charge terminal CP3+ and the third positive discharge terminal DP3+ through the third charge/discharge switch 123a and the third fuse unit 123b. In addition, the third negative terminal B3− of the third battery unit 113 is connected to the third negative charge terminal CP3− and the third negative discharge terminal DP3− through a current sensor 123e for sensing the current of the third battery unit 113. In some embodiments, the third negative terminal B3− of the third battery unit 113 is directly connected to the third negative charge terminal CP3− and the third negative discharge terminal DP3−.

The charge terminal unit 124 includes first to third positive charge terminals CP1+, CP2+ and CP3+ and first to third negative charge terminals CP1−, CP2− and CP3−. The charge terminal unit 124 has charge terminals for the first to third charge/discharge terminal unit 121d, 122d, 123d in a single physical unit.

Accordingly, the first positive charge terminal CP1+, the second positive charge terminal CP2+ and the third positive charge terminal CP3+ of the charge terminal unit 124 are electrically connected in one-to-one correspondence to the first positive charge terminal CP1+, the second positive charge terminal CP2+ and the third positive charge terminal CP3+ respectively included in the first to third charge/discharge terminal units 121d, 122d, 123d. In addition, the first negative charge terminal CP1−, the second negative charge terminal CP2− and the third negative charge terminal CP3− of the charge terminal unit 124 are electrically connected in one-to-one correspondence to the first negative charge terminal CP1−, the second negative charge terminal CP2− and the third negative charge terminal CP3− respectively included in the first to third charge/discharge terminal units 121d, 122d, 123d.

The discharge terminal unit 125 includes first to third positive discharge terminals DP1+, DP2+ and DP3+ and first to third negative discharge terminals DP1−, DP2− and DP3−. The discharge terminal unit 125 has discharge terminals for the first to third charge/discharge terminal units 121d, 122d, 123d in a single physical unit. In some embodiments, the charge terminal unit is spaced apart from the discharge terminal unit.

The positive and negative charge terminals of the charge terminal unit 124 are spaced apart from one another and the positive and negative discharge terminals are spaced apart from one another. In addition, the positive and negative charge terminals are spaced apart from the positive and negative discharge terminals by a distance greater than the spacing of the positive and negative charge terminals and greater than the spacing of the positive and negative discharge terminals.

The first positive discharge terminal DP1+, the second positive discharge terminal DP2+, and the third positive discharge terminal DP3+ of the discharge terminal unit 125 are electrically connected in one-to-one correspondence to the first positive discharge terminal DP1+, the second positive discharge terminal DP2+ and the third positive discharge terminal DP3+ respectively included in the first to third charge/discharge terminal units 121d, 122d, 123d. In addition, the first negative discharge terminal DP1−, the second negative discharge terminal DP2− and the third negative discharge terminal DP3− of the discharge terminal unit 125 are electrically connected in one-to-one correspondence to the first negative discharge terminal DP1−, the second negative discharge terminal DP2− and the third negative discharge terminal DP3− respectively included in the first to third charge/discharge terminal units 121d, 122d, 123d.

The connection control unit 130 has a controller 135, which determines whether the charger 200 is connected to an external power supply if the battery pack 100 and the charger 200 are connected to each other, and determines whether or not to maintain a series connection of the first to third battery units 111, 112 and 113.

The controller 135 includes charge recognizing units TB1 and TB2, a plurality of discharge control terminals, and first and second discharge control switches SW1 and SW2. If the battery pack 100 is connected to the charger 200, the charge recognizing units TB1 and TB2 of the connection control unit 130 may be connected to charge recognizing units TB1 and TB2 of the charger 200. The charge recognizing units TB1 and TB2 of the connection control unit 130 include a positive charge recognizing unit TB1 and a negative charge recognizing unit TB2. Likewise, the charge recognizing units TB1 and TB2 of the charger 200 include a positive charge recognizing unit TB1 and a negative charge recognizing unit TB2. If the battery pack 100 is connected to the charger 200, the positive charge recognizing unit TB1 of the connection control unit 130 is connected to the positive charge recognizing unit TB1 of the charger 200, and the negative charge recognizing unit TB2 of the connection control unit 130 is connected to the negative charge recognizing unit TB2 of the charger 200.

The connection control unit 130 detects a voltage of the charger 200 through the charge recognizing units TB1 and TB2 of the connection control unit 130 and controls switching operations of the first and second discharge control switches SW1 and SW2 according to whether a level of the detected voltage is shifted from 'high' to 'low' or vice versa, or whether a low level is maintained.

The discharge control terminals may consist of first to third positive discharge control terminals and first to third negative discharge control terminals. For example, the first to third positive discharge control terminals and the first to third negative discharge control terminals are respectively electrically connected in one-to-one correspondence to the first to third positive discharge terminals DP1+, DP2+ and DP3+ and the first to third negative discharge terminals DP1−, DP2− and DP3− of the discharge terminal unit 125. The first positive discharge control terminal DP1+ is electrically connected to a pack positive terminal P1+, and the third negative discharge control terminal DP3− is electrically connected to a pack negative terminal P3−. The pack positive terminal P1+ and the pack negative terminal P3− are terminals which are connected to an external load when the battery pack 100 is discharged.

The first and second discharge control switches SW1 and SW2 are electrically connected between discharge control terminals. For example, as shown in the embodiment of FIGS. 1A and 1B, the first discharge control switch SW1 may be electrically connected between the first negative discharge control terminal DP1− and the second positive discharge control terminal DP2+. In addition, the second discharge control switch SW2 may be electrically connected between the second negative discharge control terminal DP2− and the third positive discharge control terminal DP3+. Further, diodes D1 and D2 may be connected between the first negative discharge control terminal DP1− and the first discharge control switch SW1 and between the second negative discharge control terminal DP2− and the second discharge control switch SW2.

The diodes D1 and D2 allow the first to third battery units to be connected so as to output a discharge current when a battery pack is discharged. When a battery pack is charged, the diodes D1 and D2 prevent current path connections between the first to third battery units. As shown in FIG. 1A, the connection control unit 130 turns on the first and second discharge control switches SW1 and SW2 to electrically connect the first negative discharge control terminal DP1− and the second positive discharge control terminal DP2+ and the second negative discharge control terminal DP2− and the third positive discharge control terminal DP3+ when the battery pack 100 is in a discharge standby mode, that is, in a natural discharge state. If the first negative discharge control terminal DP1− and the second positive discharge control terminal DP2+ are connected to each other, the first negative terminal B1− of the first battery unit 111 and the second positive terminal B2+ of the second battery unit 112 are connected to each other. If the second negative discharge control terminal DP2− and the third positive discharge control terminal DP3+ are connected to each other, the second negative terminal B2− of the second battery unit 112 and the third positive terminal B3+ of the third battery unit 113 are connected, thereby establishing series connections between the first to third battery units 111, 112 and 113. The connection control unit 130 turns on the first and second discharge control switches SW1 and SW2 not only in a discharge standby mode but also in a discharge mode, thereby establishing series connections between the first to third battery units 111, 112 and 113.

The charger 200 includes a plurality of output terminals and charge recognizing units TB1 and TB2. The output terminals of the charger 200 are configured to correspond to the first to third positive charge terminal CP1+, CP2+, CP3+ and the first to third negative charge terminal CP1−, CP2−, CP3− of the charge terminal unit 124 in one-to-one relationship. For example, the plurality of output terminals of the charger 200 consist of first to third positive output terminals and first to third negative output terminals. When the battery pack 100 is connected to the charger 200, the first to third positive output terminals of the charger 200 are connected to the positive charge recognizing unit TB1 of the charger 200, and the first to third negative output terminals of the charger 200 are connected to the negative charge recognizing unit TB2 of the charger 200. Therefore, when the battery pack 100 is connected to the charger 200, for example, high-level potentials may be formed in the positive charge recognizing unit TB1 and the negative charge recognizing unit TB2.

Functionality of the battery pack 100 according to an embodiment is described with reference to the accompanying drawings.

Figure 1C:
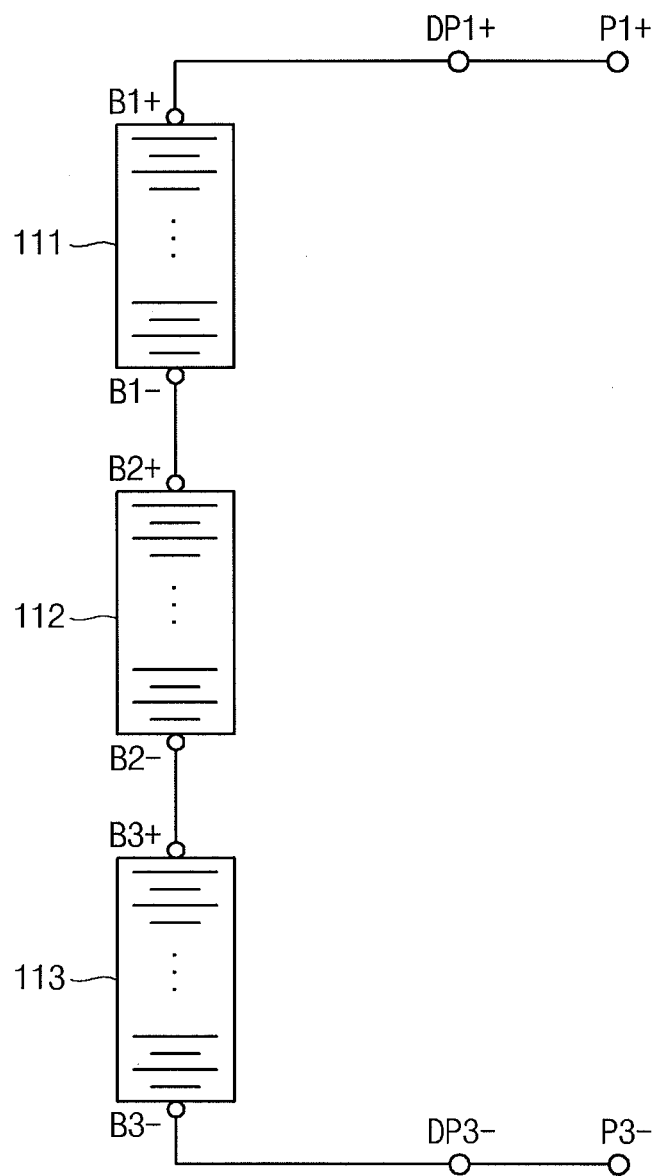
FIG. 1C is an equivalent circuit diagram of a battery pack for the battery pack discharge standby mode of FIG. 1A.
Figure 2A:
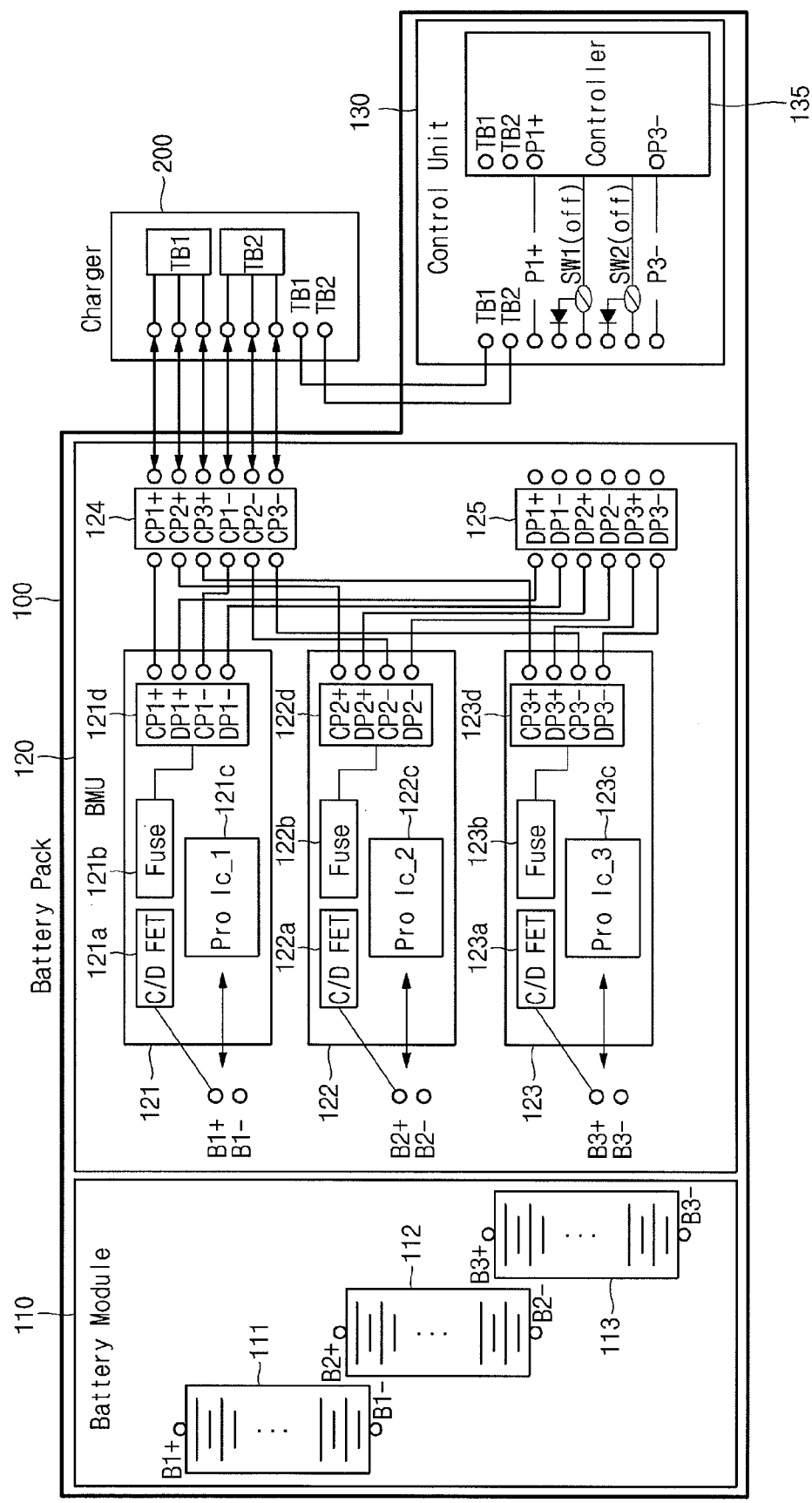
FIG. 2A is a circuit diagram illustrating a battery pack and a charger in a charge standby mode according to an embodiment of the present invention.
Figure 2B:
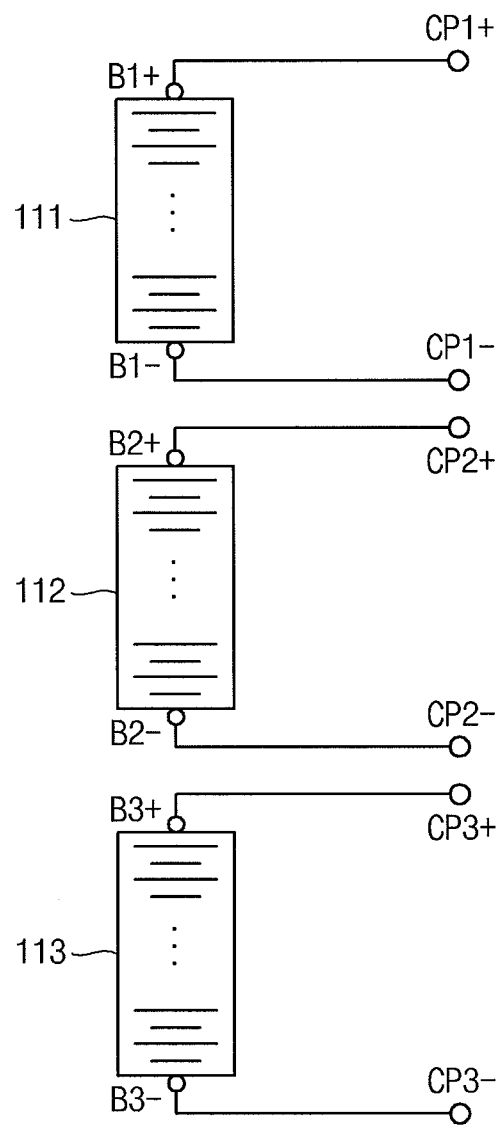
FIG. 2B is an equivalent circuit diagram of a battery pack for the battery pack charge standby mode of FIG. 2A.
Figure 3A:
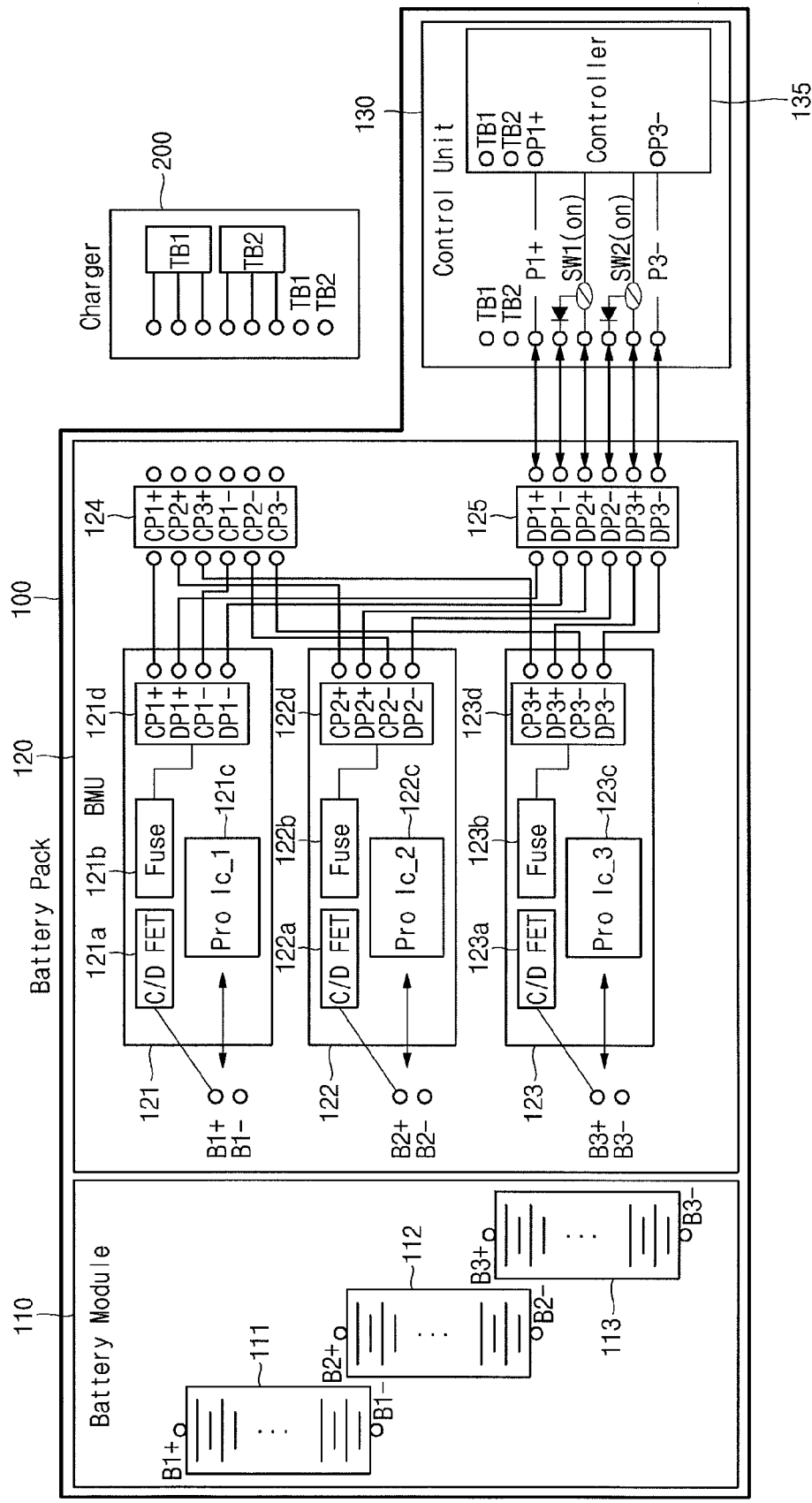
FIG. 3A is a circuit diagram illustrating a battery pack and a charger in a discharge mode according to an embodiment of the present invention.
Figure 3B:
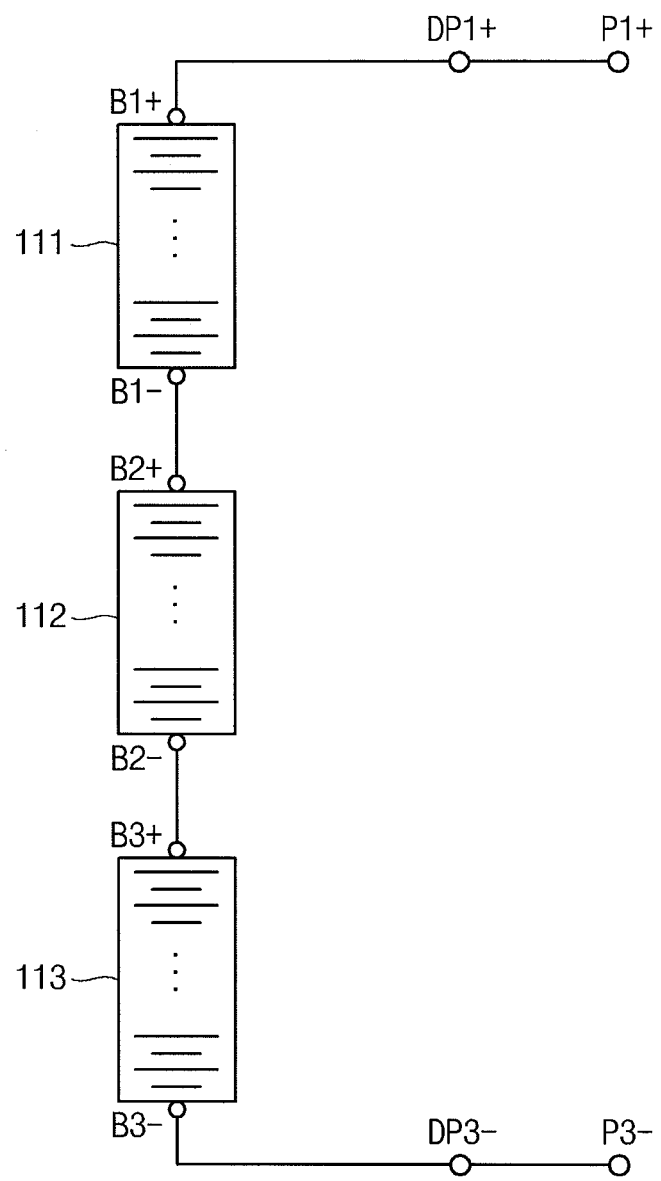
FIG. 3B is an equivalent circuit diagram of a battery pack for the battery pack discharge mode of FIG. 3A.
Figure 4:
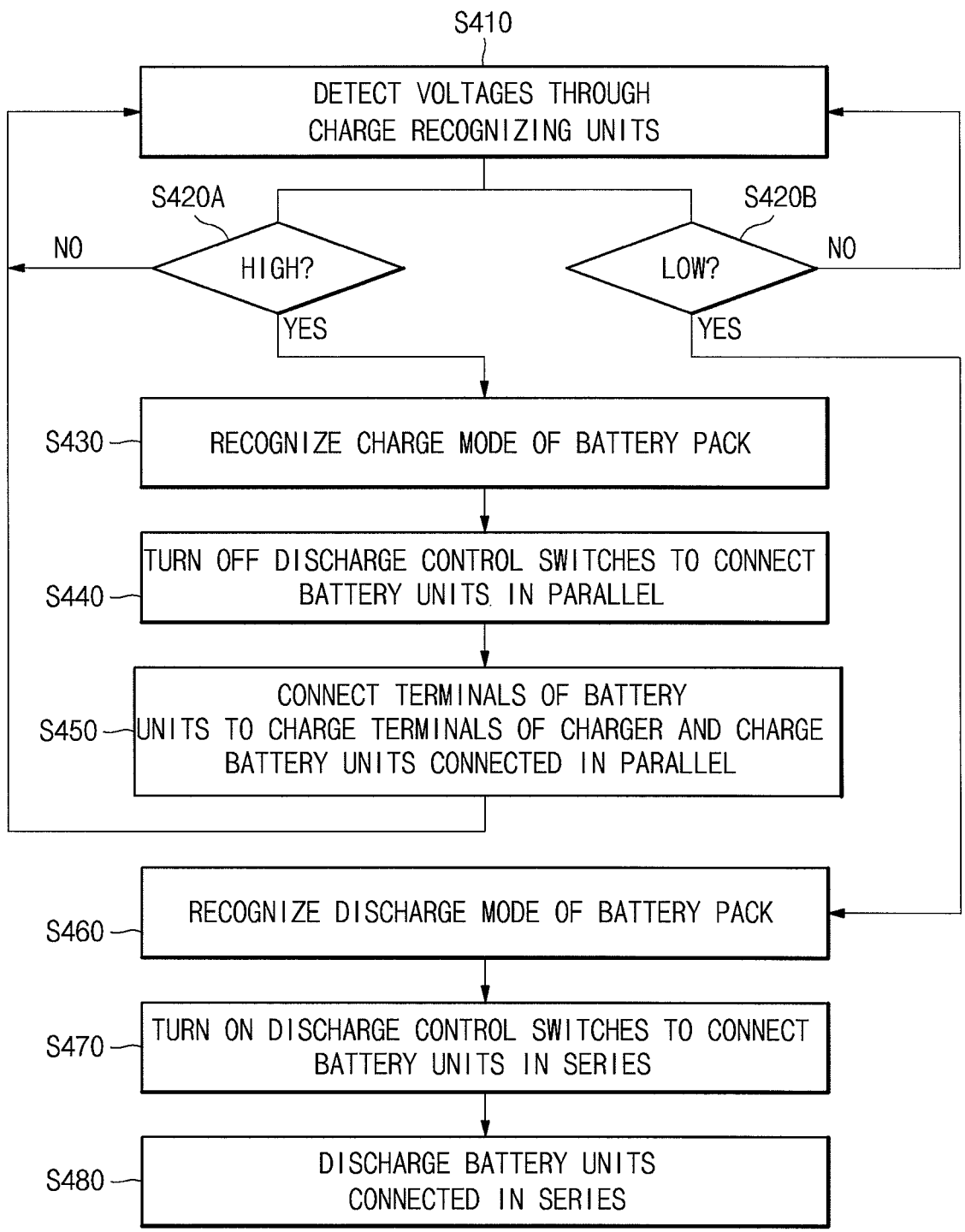
FIG. 4 is a flowchart illustrating charge/discharge operation algorithm of a battery pack according to an embodiment of the present invention.

FIG. 1C is an equivalent circuit diagram of a battery pack for the battery pack discharge standby mode of FIG. 1A. FIG. 2A is a circuit diagram illustrating a battery pack and a charger in a charge standby mode according to an embodiment, and FIG. 2B is an equivalent circuit diagram of a battery pack for the battery pack charge standby mode of FIG. 2A. FIG. 3A is a circuit diagram illustrating a battery pack and a charger in a discharge mode according to an embodiment, and FIG. 3B is an equivalent circuit diagram of a battery pack for the battery pack discharge mode of FIG. 3A. FIG. 4 is a flowchart illustrating charge/discharge algorithm of a battery pack according to an embodiment.

1. Discharge Standby Mode

In order to recognize the current mode of the battery pack 100, the connection control unit 130 continuously detects voltages of the battery pack 100 through the charge recognizing units TB1 and TB2 (S410).

The connection control unit 130 determines whether a level of the detected voltage is high (S420A) or low (S420B). If the level of the detected voltage is low (S420B), the connection control unit 130 recognizes that the battery pack 100 is in a discharge standby mode (S460).

In this case, the connection control unit 130 turns on the first and second discharge control switches SW1 and SW2 to connect the first to third battery units 111, 112 and 113 in series (S470). The connection control unit 130 turns on the first and second discharge control switches SW1 and SW2 to maintain the first to third battery units 111, 112 and 113 to be connected to each other in series when the battery pack 100 is not charged by the charger 200 or is not discharged by being connected to an external load, that is, in a natural discharge state, which may be represented by an equivalent circuit shown in FIG. 1B.

2. Charge Mode

When output terminals of the charger 200 connected to an external power supply are connected to the charge terminal unit 124 of the battery pack 100, the level of the voltage detected through the charge recognizing units TB1 and TB2 of the connection control unit 130 is shifted from 'low' to 'high' (S420A). The connection control unit 130 recognizes a mode of the battery pack 100 as a charge mode (S430). Accordingly, the connection control unit 130 turns off the first and second discharge control switches SW1 and SW2 (S440).

In such a case, the discharge terminals of the discharge terminal unit 125 are electrically disconnected from each other, thereby opening connections between each of the first to third battery units 111, 112 and 113.

The output terminals of the charger 200 are then connected to the charge terminal unit 124 of the battery pack 100 (S450). Because the respective charge terminals of the charge terminal unit 124 are connected to the terminals of the first to third battery units 111, 112 and 113, respectively, the first to third battery units 111, 112 and 113 are connected in parallel with respect to the charger 200 (S450). Therefore, the first to third battery units 111, 112 and 113 are charged in a state in which they are connected in parallel (S450).

However, if the output terminals of the charger 200 are connected to the charge terminal unit 124 of the battery pack 100 but the charger 200 is not connected to an external power supply, the level of the voltage detected through the charge recognizing units TB1 and TB2 of the connection control unit 130 is low. Therefore, the connection control unit 130 maintains the first to third battery units 111, 112 and 113 to be connected to each other in series.

3. Discharge Mode

The discharge mode recognition and functionality of the battery pack 100 are similar to the discharge standby mode recognition and functionality. As a result of the functionality of the connection control unit 130, if the voltage level is low (S420B), the connection control unit 130 recognizes a discharge mode (S460).

In such a case, the connection control unit 130 turns on the first and second discharge control switches SW1 and SW2 to connect the first to third battery units 111, 112 and 113 to each other in series (S470). If the pack discharge terminals P1+ and P3− are connected to an external load, the first to third battery units 111, 112 and 113 are discharged in a state in which they are connected in series through the pack discharge terminals P1+ and P3− (S480).

The connection control unit 130 performs similar switch control operations depending on whether the battery pack 100 is in a discharge standby mode or a discharge mode. That is to say, since the connection control unit 130 turns on the first and second discharge control switches SW1 and SW2 in both the discharge standby mode and the discharge mode, the first to third battery units 111, 112 and 113 are connected to each other in series in both cases.

Although automatic switching operation control of the battery pack 100 has been described hereinabove, manual switching operation control may also be made without departing from the features of various embodiments.

According to various aspects, battery units are charged by connecting the battery units to each other in parallel during charging, thereby reducing a total charging time of the battery pack, and the battery units are discharged by connecting the battery units to each other in series during discharging, thereby achieving a higher output battery pack.

In addition, according to the present invention, a high-capacity battery pack can be charged using a low-capacity charger. For example, a battery pack having a DC output voltage of 300 V can be charged using a charger having a DC output voltage of 100 V. That is to say, while the first to third battery units are connected in series during discharging, providing for a DC output voltage of 300 V, the first to third battery units are connected in parallel with respect to the charger during charging, thereby charging the first to third battery units having a DC output of 100 V.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention.

What is claimed is:

1. A battery pack, comprising:
a plurality of positive and negative battery terminals, configured to connect to a plurality of battery units;
a plurality of positive charge terminals, each connected to one of the positive battery terminals;
a plurality of positive discharge terminals, each connected to one of the positive battery terminals;
a plurality of negative charge terminals, each connected to one of the negative battery terminals;
a plurality of negative discharge terminals, each connected to one of the negative battery terminals;
a plurality of discharge control switches connected to the positive and negative discharge terminals; and
a control unit, configured to control the state of the switches so as to selectively series connect the battery units,
wherein the positive and negative charge terminals are formed into a charge terminal unit and the positive and negative discharge terminals are formed into a discharge terminal unit, wherein the charge terminal unit is spaced apart from the discharge terminal unit.

2. The battery pack of claim 1, wherein the battery pack is configured to provide power to a load through the positive and negative discharge terminals and to charge the battery units through the positive and negative charge terminals.

3. The battery pack of claim 1, wherein the charge terminals are spaced apart from one another and the discharge terminals are spaced apart from one another, and wherein the charge terminals are spaced apart from the discharge terminals by a distance greater than the spacing of the charge terminals and greater than the spacing of the discharge terminals.

4. The battery pack of claim 1, further comprising a diode located between one of the switches and one of the discharge terminals.

5. The battery pack of claim 1, further comprising a plurality of diodes, each respectively located between one of the switches and one of the discharge terminals.

6. The battery pack of claim 1, wherein the switches are each configured to selectively connect a positive discharge terminal of one battery unit to a negative discharge terminal of a next battery unit in the series.

7. The battery pack of claim 1, wherein the positive and negative charge terminals are each configured to connect to an external charger.

8. The battery pack of claim 1, wherein the control unit is configured to control the state of the switches such that if the battery pack is not being charged, the battery units are serially connected.

9. The battery pack of claim 8, wherein the control unit is configured to communicate with an external charger to determine whether the battery pack is being charged.

10. A battery pack, comprising:
a plurality of battery units, each configured to be individually charged by an external charger and to be discharged by providing power to an external load;
a plurality of positive and negative discharge terminals configured to provide power to the external load from the battery pack, the positive and negative discharge terminals are formed into a discharge terminal unit;
a plurality of positive and negative charge terminals, configured to charge the battery units, the positive and negative charge terminals are formed into a charge terminal unit, wherein the charge terminal unit is spaced apart from the discharge terminal unit;
a plurality of switches connected to the battery units; and
a control unit configured to control the switches so that if the battery pack is not being charged, the battery units are serially connected.

11. The battery pack of claim 10, wherein the charge terminals are spaced apart from one another and the discharge terminals are spaced apart from one another, and wherein the charge terminals are spaced apart from the discharge terminals by a distance greater than the spacing of the charge terminals and greater than the spacing of the discharge terminals.

12. The battery pack of claim 10, further comprising a diode located between one of the switches and one of the battery units.

13. The battery pack of claim 10, further comprising a plurality of diodes, each located between one of the switches and one of the battery units.

14. The battery pack of claim 10, wherein the switches are each configured to selectively connect a positive discharge terminal of one battery unit to a negative discharge terminal of a next battery unit in the series.

15. The battery pack of claim 10, wherein the control unit is configured to communicate with the external charger to determine whether the battery pack is being charged.

16. A battery pack, comprising:
a plurality of battery units, each battery unit having a positive and a negative terminal;
a plurality of positive and negative discharge terminals configured to provide power to a load from the battery pack, the positive and negative discharge terminals formed into a discharge terminal unit;
a plurality of positive and negative charge terminals configured to charge the battery units, the positive and negative charger terminals are formed into a charge terminal unit, wherein the charge terminal unit is spaced apart from the discharge terminal unit; and
a control unit configured to provide a first configuration for discharging the battery units, wherein the battery units are connected, and to provide a second configuration for charging the battery units, wherein the battery units are not connected.

17. The battery pack of claim 16, wherein in the first configuration, the battery units are serially connected.

18. The battery pack of claim 17, wherein the charge terminals are spaced apart from one another and the discharge terminals are spaced apart from one another, and wherein the charge terminals are spaced apart from the discharge terminals by a distance greater than the spacing of the charge terminals and greater than the spacing of the discharge terminals.

19. The battery pack of claim 16, further comprising:
a plurality of switches connected to the battery units; and
a diode located between one of the switches and one of the battery units.

20. The battery pack of claim 19, wherein the switches are each configured to selectively connect a positive discharge terminal of one battery unit to a negative discharge terminal of a next battery unit in a series.

21. The battery pack of claim 16, wherein the control unit is configured to communicate with an external charger to determine whether the battery pack is being charged.

22. The battery pack of claim 16, wherein the positive and negative charge terminals are each configured to connect to an external charger.

* * * * *

UNITED STATES PATENT AND TRADEMARK OFFICE
CERTIFICATE OF CORRECTION

| | | |
|---|---|---|
| PATENT NO. | : 9,444,118 B2 | Page 1 of 1 |
| APPLICATION NO. | : 13/451363 | |
| DATED | : September 13, 2016 | |
| INVENTOR(S) | : Bongyoung Kim et al. | |

It is certified that error appears in the above-identified patent and that said Letters Patent is hereby corrected as shown below:

In the Claims;

In Column 10, Line 54, Claim 16, please delete "charger" and insert therefore, --charge--.

Signed and Sealed this
Twenty-seventh Day of December, 2016

Michelle K. Lee
*Director of the United States Patent and Trademark Office*